Figure 1:
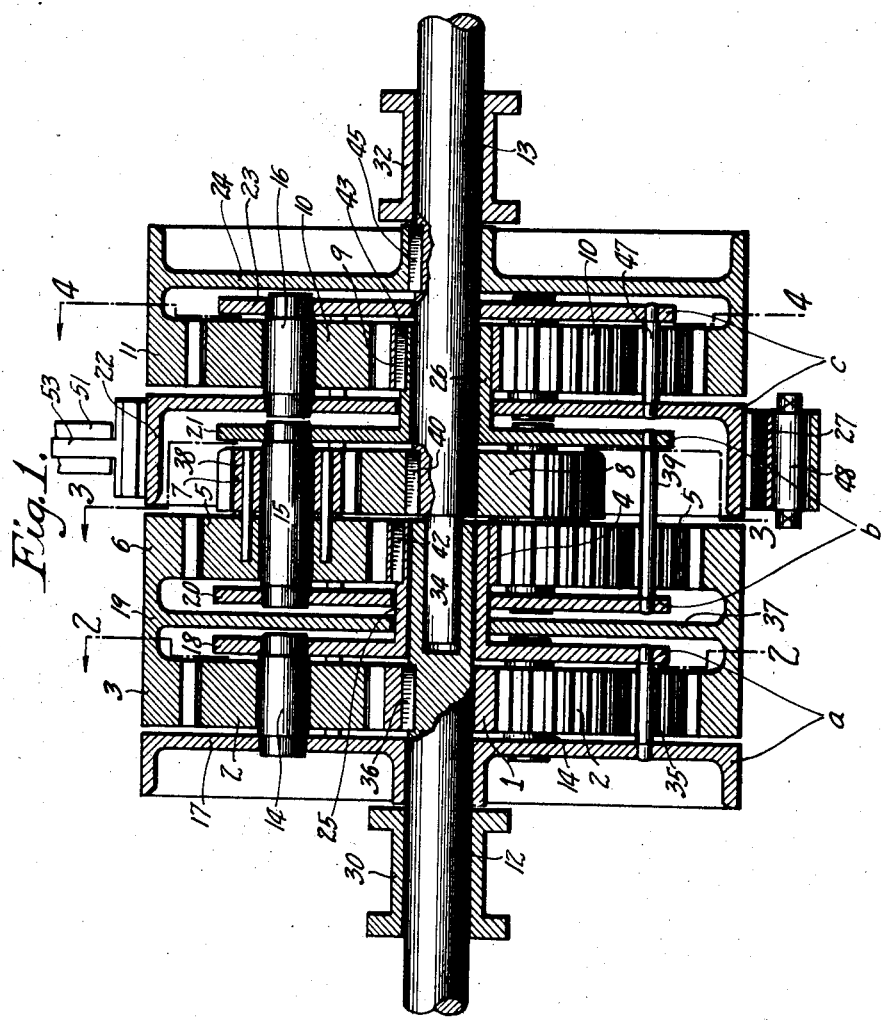

July 14, 1931.　　　　T. SAKI　　　　1,814,095
POWER SAVING DEVICE
Filed May 14, 1929　　2 Sheets-Sheet 2

Inventor
Tossy Saki.

By H. Mallinckrodt
Attorney

Patented July 14, 1931

1,814,095

UNITED STATES PATENT OFFICE

TOSSY SAKI, OF SALT LAKE CITY, UTAH

POWER SAVING DEVICE

Application filed May 14, 1929. Serial No. 363,022.

This invention relates to a power saving device, and its principal objects are:

First. To transmit motion with a minimum loss of power.

Second. To provide a system for the transmission of power, consisting of elements embodying a series of floating leverages by means of which both power and reaction are exerted upon the driven element.

Third. To provide a floating drive system by means of which power and reaction are applied to driven elements in balanced couples as opposed to one-sided moments.

Fourth. To eliminate a vast amount of wear and tear in a transmission mechanism by avoiding one-sided stresses on the various operating parts.

Fifth. To save power by reducing friction and other losses to a minimum.

Sixth. To cause the driven element to start with a zero load and to gradually apply maximum loading.

Seventh. To be applicable as an efficient speed reducer.

Eighth. To transmit a given motion, in the same direction or the reverse direction.

Ninth. To consist of relatively few parts.

Tenth. To be simple, durable and reliable in operation.

Eleventh. To be compact.

Twelfth. To maintain its integrity in the hands of unskilled persons.

The theory upon which this invention depends, may be illustrated by a simple lever supported at its center and having power applied at one end, while performing work at its other end. The power and work represent two forces acting in the same direction, while the center support, or fulcrum, represents a force equal to the sum of the other two forces, but acting in the opposite direction, which is ordinarily called reaction. When the center support is fixed, the reaction is said to be dead. When, however, the center support is made movable in the direction of the applied force, the reaction becomes a live force, as proved by experiment. This reactive force, if combined with the active original force by means of a suitable mechanism, becomes available to render a work effect, thereby creating a power saving by the greater efficiency of its application to do useful work.

In attaining the objects previously outlined herein, I employ a plurality of groups or sets of planetary gears, each set being mounted in an individual carrier. The planetary gears with their carriers, are then intergeared with a series of sun gears and internal gears in a novel way, so that rotary motion from the driver is transmitted to the driven element along two force lanes which for convenience may be termed a lane of active and a lane of reactive force.

The features of this invention for which the protection of Letters Patent of the United States is desired, are collectively grouped in the claims concluding this specification.

Figure 2:
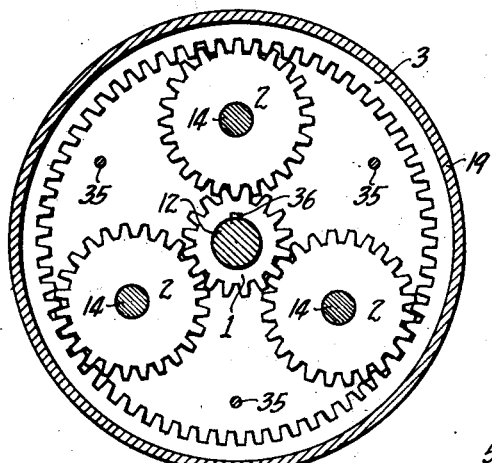
Figure 3:
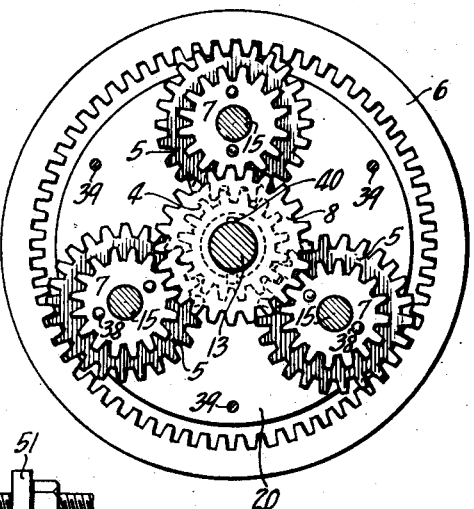
Figure 4:
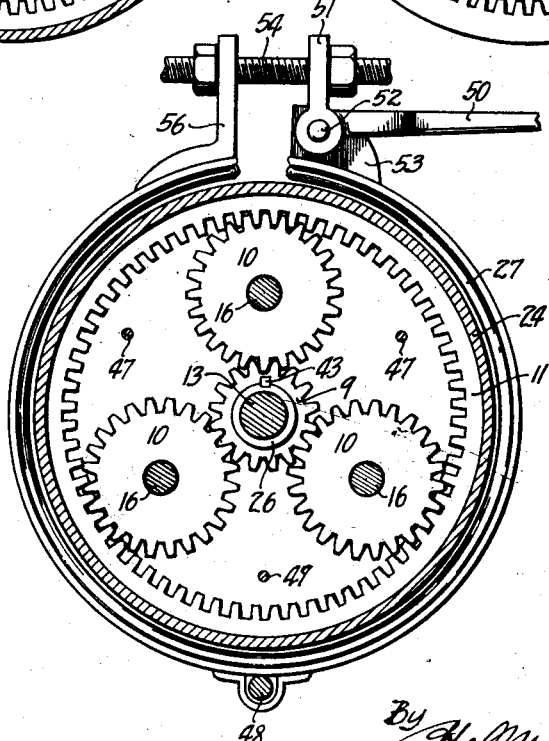

In the drawings, which illustrate one desirable embodiment of this invention,

Fig. 1 represents an axial section, parts in elevation, showing the operative elements in one particular position;

Figs. 2 and 3, transverse sections taken respectively on the lines 2—2 and 3—3 in Fig. 1;

Fig. 4, a transverse section taken on line 4—4, Fig. 1, showing parts in the background.

Referring to the drawings, the numeral 12 indicates a driving shaft journaled in a bearing 30 and receiving its power from any suitable source, such as an electric motor or an internal combustion engine of usual construction, (not shown). At 13 is a driven shaft which may be journaled in the bearing 32, and which, further, may have the integral extension 34, of sufficiently small diameter so as to be journaled in the contiguous end of the shaft 12, the latter being bored out to receive the said extension. This assures axial alignment between the two shafts and aids in steadying them relatively to each other.

Rotatably mounted on the shaft 12 is a wheel 17 and spaced axially apart from the latter, but also rotatable on the shaft 12, is a spider or disk 18 which may be provided with the integral hub 25. The web of the wheel 17 may be rigidly connected to the disk 18 by means of pins 35.

Mounted on the shaft 12, and rigidly fastened thereto, for instance, by means of the key 36, is a sun gear 1. Meshing with this sun gear are planetary gears 2, these being journaled on the shafts 14 which are carried in the wheel 17 and the disk 18. Thus, the wheel 17 and the spider or disk 18 form a rotatable cage or carrier $a$ for the planetary gears 2. Meshing with the gears 2, is an internal gear portion 3, formed on one side of a wheel 19, the latter having a web 37 which may be rotatable on the hub 25. This wheel, on the opposite side of the web, carries the internal gear portion 6, which meshes with a plurality of planetary gears 5. These planetary gears in turn, mesh with a sun gear 4, which latter may be keyed as at 42, or otherwise rigidly fastened on the hub 25. The two gear portions 3 and 6 may for convenience be considered as a single internal gear.

Rigidly connected to the planetary gears 5, for instance by means of the pins 38, are the gears 7, these being rotatable on the shafts 15. The union of gears 5 and 7 may be termed duplex gears and obviously might be made in one piece (not shown). These duplex gears may be mounted in disks or spiders 20 and 21, which are rigidly connected to each other by means of the pins 39. Meshing with the gears 7 is the sun gear 8 mounted on the shaft 13 and fastened thereto by means of the key 40. The disk 20 is rotatable on the hub 25, while the disk 21 is integral with the hub 26, which latter is rotatable on the shaft 13. Thus, the disks 20 and 21 form a rotatable cage or carrier $b$ for the planetary duplex gears 5—7.

Keyed as at 43, or otherwise rigidly mounted on the hub 26 is a sun gear 9 which meshes with a plurality of planetary gears 10, these in turn meshing with an internal gear 11 forming part of a wheel 24, which latter is mounted on shaft 13 and rigidly fastened thereto, as at 45, for instance by keying.

The planetary gears 10 may be rotatable on the shafts 16, and the latter may be mounted in the web of a drum 22 and the web of a disk or spider 23, the disk or spider being rotatable on shaft 13. The drum 22 and the disk or spider 23 may be rigidly connected to each other by means of the pins 47, thus forming a cage or carrier $c$ for the planetary gears 10.

A brake or clutch band 27 may extend around the drum 22 and be supported on a stationary pin 48. The tightening of clutch band 27 may be effected by a bell crank having a lever 50 and a short arm 51, pivoted at 52 in a lug 53, the latter forming an integral part of the clutch band at one end thereof. An adjustable bolt 54 may extend to another lug 56 at the other end of the clutch band, so that by moving lever 50 downwardly, the band is closed in or contracted around the drum.

Various operating phases or conditions of this mechanism will now be discussed.

Supposing first that motion is imparted to shaft 12, then sun gear 1 will cause the planetary gears 2 to rotate in a direction opposite to that of the sun gear, either with, or without, as the case may be, planetary motion around the shaft axis. If the wheel 17 were to be held stationary, there would be only rotary motion of the gears 2, while if the wheel 19 were to be held stationary, there would be both rotary motion and the maximum of planetary motion of these same gears. If neither of the wheels 17 or 19 are held stationary, the amount of rotation of each is proportional to the amount of resistance offered to the other. When the wheel 19 is stationary, the ratio of transmission of sun gear 4 is less than that of internal gear 6 when carrier $a$ is stationary. However, both the gears 4 and 6 mesh with the planetary gears 5. The planetary gears 5 act as equilibrants and equalize the ratio of transmission of both gears 4 and 6, thus keeping the identical position relatively to each other, just as if the carrier $b$ remained stationary.

Any retardation in the motion of wheel 19 causes a corresponding reaction on the shafts 14 of the planetary gears 2, and tends to rotate the carrier $a$ in the same direction of rotation as sun gear 1. Thus, the first set of planetary gears, that is the set mounted in carrier $a$, together with the internal gear 3, constitutes a floating drive system in which power is applied to the planetary gears so as to create a moving reactive force upon shafts 14.

Taking into consideration a special case, power may be applied to either the sun gear 1 or internal gear 3; then the planetary gears 2 will have planetary motion in the direction of the mover. Assuming the rotation of sun gear 1 to be in the clockwise direction, then the internal gear 6, being integral with the internal gear 3, will naturally rotate counter-clockwise, and will cause the duplex gears 5—7 to rotate in the counter-clockwise direction. The carrier $a$, moving with planetary gears 2, rotates clockwise, therefore, sun gear 4 will also rotate clockwise, and in turn will act upon the gears 5 to rotate the duplex gears 5—7 counter-clockwise, thereby augmenting the rotary motion received by gears 5—7 from internal gear 6.

Now, supposing further, that clutch band 27 is free from engagement with the drum 22, and that the shaft 13 is not loaded and has no frictional resistance; then the shaft 13 will be driven in the clockwise direction, and the planetary gears 10 would necessarily have planetary motion clockwise. This means that planetary gears 7 with the power received by the gears 5 from sun gear 4 and from internal gear 6, without planetary motion in counter-clockwise direction, would drive the central gear 8 and shaft 13, clockwise.

From this point of view, the gears 5 receive counter-clockwise motion from pinion 4 and from internal gear 6 in equal amounts with no reaction on the shafts 15.

If the shaft 13 is loaded, then the gears 5—7 are caused to have planetary motion in the counter-clockwise direction by the reaction which acts on the shafts 15, and the carrier b is caused to assume rotation with the planetary motion of gears 5—7. With the rotation of the carrier b, sun gear 9, being fast on the hub 26, will cause clockwise rotation and counter-clockwise planetary motion of gears 10. This means that the reaction drives the carrier b counter-clockwise.

By tightening clutch band 27, the carrier c will be retarded accordingly and will be finally brought to rest. When this occurs, the planetary motion of gears 10 will have ceased and the entire rotary motion thereof will have become effective to rotate the wheel 24, and therefore shaft 13 also. As a consequence, at first the entire planetary motion of gears 5—7 is transmitted as rotary motion through sun gear 9, planetary gears 10 and wheel 24 to shaft 13. The rotary motion of gears 5—7 is transmitted directly to shaft 13 through central gear 8. Thus it will be seen that finally there is a balancing of power and reaction in motion, in opposite directions, transmitted from duplex gears 5—7 through gear 8 and carrier b, and again concentrated on shaft 13.

Many uses exist for the present invention, a very important one being in connection with variable speed power transmission systems. By providing various appurtenances (not shown) for individually controlling the significant members of my power saving device, a number of different speeds and directional motions may be established between the driving and driven elements. Such appurtenances, however, do not constitute parts of my present invention, hence are not illustrated.

The mechanism as shown in Fig. 1, is seperable into several useful entities, each of which nevertheless, employs the fundamental principles of my invention. For instance, wheel 24, carrier c with its planetary gears, and sun gear 9, could be omitted, and motion be derived directly from carrier b. Again, sun gear 1, carrier a with its planetary gears, and internal gear 3, could be used alone, motion being derived directly from carrier a; in this case it would be a purely reactionary drive.

While a specific embodiment of this invention is herein shown and described, it is to be clearly understood that all the detailed parts thereof, may or may not be shown in the preferred forms, and further, that the preferred forms may be varied from time to time as the development of this invention and the arts to which it appertains, advance. Therefore, the essential and characteristic features of this invention are to be discerned from the claims in which its spirit is generalized.

Having fully described my invention, what I claim is:

1. In combination, a sun gear, planetary gears in mesh with said sun gear, an internal gear in mesh with said planetary gears, a second internal gear integral with the first internal gear, other planetary gears in mesh with said second internal gear, a second sun gear in mesh with said other planetary gears, said second sun gear mounted to rotate in unison with the revolution of said planetary gears, auxiliary gears concentric and rigidly associated with said other planetary gears, and a driven sun gear in mesh with said auxiliary gears.

2. In combination, a sun gear, a carrier concentric and rotatable with respect to said sun gear, planetary gears rotatably mounted in said carrier, said planetary gears in mesh with said sun gear, a second sun gear rigidly mounted on said carrier, a second carrier substantially concentric with said first carrier, duplex planetary gears rotatably mounted in said second carrier, an internal gear simultaneously in mesh with the first-mentioned planetary gears and with said duplex planetary gears, and a driven sun gear in mesh with said duplex planetary gears.

3. In combination, a drive shaft, a sun gear rigidly mounted thereon, a carrier rotatably mounted on said drive shaft, a sleeve integral with said carrier, planetary gears rotatably mounted in said carrier, said planetary gears in mesh with said sun gear, a second sun gear rigidly mounted on said sleeve, other planetary gears in mesh with said second sun gear, auxiliary gears substantially integral with said other planetary gears, a driven sun gear in mesh with said auxiliary gears, and an internal gear simultaneously in mesh with the first-mentioned and the second-mentioned planetary gears.

4. In combination, a driving shaft, a carrier consisting of radially extensive members spaced apart from one another, said radially extensive members journaled on said drive shaft, a sun gear rigidly mounted on said drive shaft between said radially extensive members, planetary gears rotatably mounted in said carrier, said planetary gears in mesh with said sun gear, a sleeve extending axially from one of said radially extensive members, a sun gear rigidly mounted on said sleeve, a driven shaft in substantial axial alignment with said drive shaft, and a system of gears operatively interposed between said driven shaft and the second-mentioned sun gear, the said system including duplex planetary gears in mesh with the said second-mentioned sun gear.

5. In combination, a driven shaft, a sun gear rigidly mounted thereon, planetary gears in mesh with said sun gear, a carrier in which said planetary gears are rotatably mounted, a second sun gear rigidly mounted on said carrier, other planetary gears in mesh with the second-mentioned sun gear, a carrier for the second-mentioned planetary gears, means for selectively holding the second-mentioned carrier against rotative movement, an internal gear rigidly mounted on said driven shaft, said internal gear being in mesh with the second-mentioned planetary gears, a drive shaft in substantial axial alignment with said driven shaft and a system of gears transmitting motion from said drive shaft to the first-mentioned planetary gears.

6. In combination, a sun gear, planetary gears in mesh with said sun gear, an internal gear in mesh with said planetary gears, a carrier in which said planetary gears are mounted, a second sun gear rigidly connected to said carrier, duplex planetary gears in mesh with said second sun gear and said internal gear, another sun gear in mesh with said duplex planetary gears, another carrier in which said duplex planetary gears are mounted, a driven element, and means for transmitting reactive stress from said second-mentioned carrier to said driven element.

7. In combination, a driven shaft, a sun gear rigidly mounted thereon, duplex planetary gears in mesh with said sun gear, a carrier in which said duplex planetary gears are rotatably mounted, a second sun gear rigidly mounted on said carrier, other planetary gears in mesh with the second-mentioned sun gear, a carrier for the second-mentioned planetary gears, means for selectively holding the second-mentioned carrier against rotative movement, said means including a band clutch engaging a rotatable drum, and means for imparting motion to said duplex planetary gears.

8. A power saving device including in combination a sun member, planetary members deriving motion from said sun member, means for rotatably supporting said planetary members, duplex planetary members spaced axially apart from the first-mentioned planetary members, means for rotatably supporting said duplex planetary members, means transmitting motion from the first-mentioned planetary supporting means to said duplex planetary members, means simultaneously transmitting motion from the first-mentioned planetary members to said duplex members, a sun member deriving motion from said duplex members, a planetary system deriving motion from said duplex members, a driven member rigidly connected to the last-mentioned sun member and to the said planetary system, and braking means to control said planetary system.

9. A power saving device comprising in combination, a drive shaft, a sun gear rigidly mounted on said drive shaft, planetary gears in mesh with said sun gear, an internal gear in mesh with said planetary gears, a carrier having rotary motion due to the planetary motion of said planetary gears, a second sun gear rigidly connected with said carrier, duplex planetary gears in mesh with said second sun gear and said internal gear, a third sun gear in mesh with said duplex planetary gears, a driven shaft rigidly connected with said third sun gear, a second carrier having rotary motion due to the planetary motion of said duplex planetary gears, a fourth sun gear rigidly connected to said second carrier, other planetary gears in mesh with said fourth sun gear, a second internal gear in mesh with said other planetary gears, said second internal gear rigidly mounted on said driven shaft, a third carrier having rotary motion due to the planetary motion of said planetary gears, and means for selectively preventing the planetary motion of said other planetary gears.

10. In combination, a sun gear, planetary gears in mesh with said sun gear, an internal gear member in mesh with said planetary gears, a carrier having rotary motion due to the planetary motion of said planetary gears, a second sun gear rigidly connected with said carrier, duplex planetary gears in mesh with said second sun gear member and said internal gear, a third sun gear in mesh with said duplex planetary gears, a second carrier rotatable by the planetation of said duplex planetary gears, and means for transmitting the reactional stress from said second carrier to a driven element.

11. In combination, a sun gear, planetary gears in mesh with said sun gear, an internal gear member in mesh with said planetary gears, a carrier having rotary motion due to the planetary motion of said planetary gears, a second sun gear rigidly connected with said carrier, duplex planetary gears in mesh with said second sun gear and said internal gear member, a third sun gear in mesh with said duplex planetary gears, a second carrier having rotary motion due to the planetary motion of said duplex planetary gears, a fourth sun gear rigidly connected with said second carrier, other planetary gears in mesh with said fourth sun gear, a second internal gear in mesh with said other planetary gears, said second internal gear rigidly connected with said third sun gear, a third carrier having rotary motion due to the planetary motion of said last-mentioned planetary gears, a driven element, and means for concentrating said power and said reactional stress upon said driven element.

12. In combination, a drive sun gear, planetary gears in mesh with said sun gear, an internal gear member in mesh with said planetary gears, a carrier having rotary motion due the planetary motion of said planetary gears due to reactive force, a second sun gear rigidly connected with said carrier, duplex planetary gears in mesh with said internal gear member and said second sun gear, a second carrier having rotary motion due to the planetary motion of said duplex planetary gears due to reactive force, a driven element connected with said second carrier, another driven element engaging said duplex planetary gears, and a floating drive assemblage for simultaneously driving said driven elements by the power of said duplex planetary gears and the last-mentioned reactive force.

13. In combination, a driving sun member, planetary members deriving motion from said sun member, a carrier rotatably supporting said planetary members, duplex planetary members spaced axially apart from said planetary members, means for simultaneously driving said duplex planetary members by applied power and reactive force, a driven sun member engaging said duplex planetary members, a load-bearing member rigidly connected with said driven sun member, a second carrier supporting said duplex planetary members, said second carrier being disposed to rotate due to reactive force exerted by the power of said duplex planetary members and a given load on said load-bearing member, a driven member connected with said second carrier, and floating means for simultaneously driving said load-bearing member and said driven member.

14. In combination, a drive shaft, a driven shaft in substantially axial alignment therewith, a sun gear rigidly mounted on said drive shaft, primary planetary members deriving motion from said sun gear, a carrier rotatably supporting the primary planetary members, duplex planetary members spaced axially apart from said primary planetary members, floating means for simultaneously driving said duplex planetary members by applied power and reactive force, a driven sun gear rigidly mounted on said driven shaft and drivable by said duplex planetary members, a second carrier supporting said duplex planetary members, said second carrier being disposed to rotate due to the reactive force exerted by the power of said duplex planetary members and a given load on said driven shaft, other planetary members in proximity to said second carrier, means for transmitting the last-mentioned reactive force from said second carrier to said other planetary members, means for transmitting said other reactive force from said other planetary members to said driven shaft, a third carrier rotatably supporting said other planetary members, and means for controlling the planetary motion of said other planetary members, all for the purpose of simultaneously driving said driven shaft by the power exerted by said duplex planetary members and the last-mentioned reactive force.

In testimony whereof, I sign my name hereto.

TOSSY SAKI.